United States Patent Office 3,366,908
Patented Jan. 30, 1968

3,366,908
CONTACT-FREE ROTARY RESISTOR
ARRANGEMENT
Herbert Weiss, Nurnberg, and Paul Hini, Erlangen, Germany, assignors to Siemens-Schuckertwerke Aktiengesellschaft, Berlin and Erlangen, Germany, a corporation of Germany
Filed Oct. 22, 1965, Ser. No. 500,637
Claims priority, application Germany, May 7, 1965, S 96,984; May 31, 1965, S 97,386
16 Claims. (Cl. 338—32)

ABSTRACT OF THE DISCLOSURE

A galvanomagnetic semiconductor rotary resistor arrangement comprising a magnetic circuit having a magnetic stationary portion defining an air gap and a magnetic portion adapted to be rotated about an axis of rotation and disposed within said air gap to be freely rotatable therein, at least one galvanomagnetic semiconductor field plate means being mounted in said air gap so as to be traversible by a magnetic field upon rotation of said rotatable magnetic portion, means for connecting said plate means in an electrical circuit, and magnetic material adjusting means provided in one of said portions which is movable to adjustably vary the magnetic flux in said air gap.

Our invention relates to rotary resistor arrangements. More particularly, it relates to such novel arrangements employing galvanomagnetic semiconductor field plates.

It is, at present, a known technique to dispose galvanomagnetic semiconductor field plates in the air gap defined by the pole shoes of magnets and to thereby provide contact-free resistors or potentiometers, such resistors being rendered variable by changing the magnetic field to which they are subjected such as by varying the amount of the field plate disposed in the air gap. The variable resistors and potentiometers differ from each other only in the fact that, for adapting the field plate to be connected in an electrical circuit as a resistor, it is provided with an electrical terminal at each end and for adapting it to be connected in an electrical circuit as a potentiometer, it is provided with a third electric terminal intermediate the two end electric terminals.

The maximum electrical resistance of a field plate is attained when the latter is completely contained within the air gap, i.e., the magnetic circuit and resistance characteristic can be variably reduced to a minimum or base resistance value of the field plate by correspondingly varying the amount of the field plate contained in the magnetic circuit, i.e., smoothly pulling the field plate out of the air gap.

Many types of variable rotary resistor arrangements embodying galvanomagnetic semiconductor field plates have been proposed. The magnetic circuits in such arrangements, in the simplest versions employ permanent magnets for providing magnetic excitation in the circuits, generally comprise stationary magnetically excited structures and rotary magnetic structures which are rotatable about an axis of rotation relative to the stationary structures and which complete the magnetic circuit together with the stationary structures, such rotary structures suitably being designated as magnetic yokes. In these rotary arrangements, the yokes are dimensioned to be freely rotatable in an air gap defined by the opposing faces of magnetic pole shoes, at least one semiconductor field plate being provided in this space, such field plate suitably being mounted on one of the pole shoe faces in the stationary portion of the magnetic circuit.

Rotary resistor arrangements as described hereinbelow may conveniently be divided into two groups as to their types. A first of these groups includes such rotary resistor arrangements wherein the direction of the magnetic flux in the air gap is substantially perpendicular to the direction of the axis of rotation. The second of the aforesaid groups includes those rotary resistor arrangements in which the direction of the magnetic flux in the air gap is substantially parallel to the rotational axial direction. This second group type is generally preferred since the magnetic yoke in such type rotary resistor arrangement need only have a diameter about equal to the diameter of the stationary portion of the magnetic circuit and thereby there is enabled simplification in the production and calibration of the galvanomagnetic semiconductor rotary resistor arrangements.

A rotary resistor arrangement of the abovementioned first group type may be designed whereby the magnetic yoke therein, which is disposed to be rotated about an axis of rotation that lies substantially perpendicularly to the magnetic lines of force in the air gap, may be precisely fitted into the air gap defined by the opposing faces of the pole shoes of the stationary portion of the arrangement, such air gap suitably having a cylindrical or part of a cylindrical configuration. In this type of geometrical design, the magnetic flux in the air gap lies radially or diametrically with respect to the axis of rotation. The rotatable magnetic yoke is shaped whereby, upon its rotation, its edge periphery which opposes the stationary portion to define a space therebetween, scans the field plate along the axial direction. In such arrangement, the longitudinal disposition of the field plate and the axial direction are substantially parallel and upon the rotation of the yoke, its outer edge moves in the axial direction, i.e., the longitudinal direction of the field plate. By longitudinal disposition or direction of the field plate, there is also meant the direction of current flow through the field plate when it is connected in electrical circuit. The width of the field plate, as stated herein, is intended to signify that dimensions of the field plate which is perpendicular to the current flow direction therethrough, both the longitudinal and width dimensions of the field plate being measured in the plane thereof.

The rotatable magnetic yoke may suitably comprise a solid or lamellar, soft, i.e., high permeability, magnetic material, or ferrite. A suitable configuration for the yoke may be, for example, that of a worm having one turn and whose peripheral outer edge runs parallel to the inner surfaces of cylindrical sector shaped pole shoes. In the air gap defined by the opposing faces of the pole shoes, such worm shaped yoke is disposed and adapted to be rotated about the axis of rotation of the worm. For convenience of visualization, the configuration of the worm can be likened to that of a radially split ring, i.e., a lock washer for screws. Upon rotation of the worm, its peripheral edge traverses the field plate and pole shoes along the axial direction.

If, for example, a field plate is disposed in the air gap and the field plate is a two-terminal one, i.e., has an electrical terminal at each end thereof in the longitudinal direction, then, with the selection of an appropriate configuration and peripheral thickness (measured in the axial direction) of the worm edge, a predetermined linear, parabolic or exponential resistance characteristic curve in dependence upon angle of rotation may be produced in the rotary resistor arrangement.

The magnetic yoke of the rotary resistor arrangement may also be a slanted circular disc mounted at an angle other than a right angle relative to the axis of rotation, the outer peripheral edge of the yoke being parallel to the cylindrical axis of the pole shoes of the stationary portion of the magnetic circuit. With such arrangement, using, for example, a two terminal galvanomagnetic semiconductor field plate, a substantially sinusoidal resistance characteristic curve in dependence upon the angle of rotation is obtained.

In the place of the above described configurations of the components of the rotary resistor arrangements, the shapes of the components may be chosen whereby the direction of the magnetic flux in the air gap is substantially parallel to the axial direction, such parallel directionalism being characteristic of the above-mentioned second group type of rotary resistor arrangement. Such configurations signify that planes which pass through the opposing faces of the pole shoes of the stationary portion of the magnetic circuit and the faces of the yokes intersect the axis of rotation in a vertical direction. Similar to the first group type rotary resistor arrangement, the yoke in the second group type may be worm-shaped. However, the surface planes of the opposing faces of the pole shoes and the yoke are disposed parallel to the axis of rotation in the second group type rotary resistor arrangement. Therefore, in this second group type worm-shaped yoke, effectively, the pole shoe may be described as a planar spiral. The stationary portion of the magnetic circuit may in the simplest embodiment be a permanent magnet with two pole shoes extending laterally in the same direction from its ends. At least one galvanomagnetic semiconductor field plate is firmly affixed to one of the respective opposing faces of the pole shoes.

The latter field plate may have an area coextensive with the area of the face of the pole shoe to which it is affixed, i.e., substantially cover the whole pole shoe face if it is of the three-terminal type. However, it may be smaller, particularly if it is of the two-terminal type. In this latter embodiment, its area is chosen to be somewhat less than half of the area of the pole shoe face upon which it is disposed. The width of the pole shoe face is generally chosen to be a little more than twice the width of the worm shaped air gap defining opposing worm-shaped face of the yoke, both of these widths being measured in the radial direction. In addition, the largest and smallest radii of the worm-shaped opposing face surface are usually so selected that the magnetic flux in the air gap cannot interfere with the rotation of the yoke. The pole shoe of the stationary portion of the magnetic circuit may also have the shape of a relatively flat cylinder whose axis is the same as the axis of rotation. The inner and outer peripheries of this cylinder then provide circular, coaxial enclosures of the worm-shaped pole shoe, i.e., the yoke.

The rotary resistor arrangements of the second group type may be designed whereby there may be obtained therefrom a predetermined resistance characteristic in dependence upon angle of rotation which may, for example, be linear, parabolic, or exponential.

The resistance characteristics obtainable with both the first and second group type rotary resistor arrangements, expressed by mathematical functions, are generally achieved with errors in the order of about one percent. Such errors are caused by undesirable effects of the magnetic field and in homogeneity in the galvanomagnetic semiconductor field plate.

Accordingly, it is an important object of this invention to provide a rotary resistor arrangement embodying a galvanomagnetic semiconductor field plate having resistance characteristics which are substantially improved in preciseness as compared to heretofore known arrangements of the same character.

This object is achieved by providing a rotary resistor arrangement which comprises a magnetic circuit in which the parts thereof are rotatable relative to each other about an axis of rotation. The opposing pole shoe faces of these parts which define an air gap therebetween are so configured whereby, upon the rotation of one of the parts of the magnetic circuit, its pole shoe opposing face surface shifts at a substantially constant air gap width, relative to the opposing face surface of the field plate carrying opposing pole shoe, such shift being parallel to the surface of the field plate. A feature of the invention is the providing of at least one pole shoe with at least one soft, i.e. high permeability magnetic adjusting member, whereby its center of gravity is movable relative to the geometrically central point of the air gap.

Within the framework of the hereinabove set forth first and second group type rotary resistor arrangements, and in accordance with a further feature of the invention, the opposing pole shoes may be configured whereby the direction of the magnetic flux in the air gap is radial relative to the disposition of the axis of rotation. In the rotary resistor arrangements of the first group type according to the invention, soft magnetic material headless screws may be used as the above-mentioned adjusting members, these screws being turned in threaded bores provided therefor in the pole shoes, the bores extending in a direction parallel to the axis of rotation. With the aid of these headless screws, the magnetic flux in the air gap between the yoke and the stationary portion of the magnetic circuit containing the field plate may be so adjusted whereby the resistance characteristic of the rotary resistance arrangement is in accordance with a prescribed mathematical function. The headless screws, which may be provided in an amount of 10 or more, for example, at the periphery of the yoke, aid in reducing deviations in the resistance characteristic from a magnitude of 1% to about 0.1%.

In place of the headless screws, there may be utilized, according to the invention, as adjusting members, elastic, soft magnetic material discs. Such discs may be disposed at least at one side surface of the yoke at an adjustable distance therefrom. With the employment of such adjusting member in such arrangement, the connection of the resistance characteristic is enabled to be more delicate, and is not as locally limited, as it is with the use of headless screws.

In another embodiment of a rotary resistor arrangement of the first group type according to the invention, i.e., one in which the magnetic flux is radial or perpendicular with respect to the axis of rotation, the adjusting member may be a soft magnetic material circular disc which is disposed on the axis of rotation and spaced from the rotary portion of the magnetic circuit, i.e., the yoke, and is relatively closely but freely fitted into the space defined by the opposing faces of stationary pole shoes.

In an example of the latter embodiment, the circular disc is elastic and its edge is adjustable in the axial direction particularly through the use of adjusting screws, and in phases. The disc may thereby be disposed on a rotatable, rigid, and particularly non-magnetic abutment. The distance between the edge of the disc and the abutment may then be adjusted in phases with the use of adjusting screws. In a modification of this arrangement, soft magnetic material adjusting discs may also be provided at both sides of the yoke.

If the magnetic field between the pole shoes is to be adjusted in specific and narrowly limited regions of the yoke, radially disposed grooves may be provided near the edge of the disc and one or more of the sectors of the disc defined by these grooves may be bent out from their plane in the direction of the axis of rotation. For example, 20 to 50 radial grooves may be made in a disc, such as by sawing. The length of the groove may, for example, be about one half the length of the radius of the disc. If, however, the magnetic field is to be adjusted only slightly in large regions and with delicate functions between the areas, then the grooves are dispensed with and the disc is elastically bent with adjusting screws.

Further, in the rotary resistor arrangements, according to the invention, and of the first group type, the adjusting of the magnetic field in the region of the yoke may also be effected by cutting the edge of the circular disc at one or several places an appropriate amount. For example, the disc may be filed at these places. This embodiment may be combined with those previously mentioned hereinabove.

Other embodiments, according to the invention, may be those that fall into the second group type, i.e., rotary resistor arrangements in which the direction of the magnetic flux in the air gap is essentially parallel to the axis of rotation. In these rotary resistor arrangements, a pole shoe surface is formed by parts of a circular ring and the opposing planar surface has the shape of spiral band with a winding turn. In some embodiments of these rotary resistor arrangements, the adjusting members are movable along the direction of the axis of rotation.

An adjusting member may particularly comprise a soft magnetic material disc which approximately fills in the area of the spiral turn. The distance between the disc and the air gap is adjustable, for example, with the use of soft magnetic material adjusting screws. In the place of the screws, the adjusting members may also be soft magnetic material approximately flat wire brackets which are positioned in the space of the spiral turn and which lie approximately in the plane of the pole shoe face surface. The distance between the wire brackets and the air gap may be made adjustable, particularly with the use of soft magnetic material adjusting screws.

Another embodiment of the adjusting member according to the invention is an elastic soft magnetic material band which may be provided on at least one of the two side surfaces of the worm shaped pole shoe, i.e., the yoke. The distance of such soft magnetic material band from the side surface of the pole shoe may then be adjusted with adjusting screws which are screwed into the pole shoe along a direction perpendicular to the direction of the magnetic flux in the air gap.

Generally speaking and according to the invention, there is provided a galvanomagnetic semiconductor rotary resistor arrangement which comprises a magnetic circuit comprising a magnetic stationary position defining an air gap and a magnetic portion adapted to be rotated about an axis of rotation and which is disposed within the air gap. At least one galvanomagnetic semiconductor field plate means is included disposed in the air gap and is adapted to be connected in an electrical circuit. There is further provided an adjusting means comprising a magnetic material in one of the magnetic circuit portions which is movable to vary the magnetic flux in the air gap.

The foregoing and more specific objects of our invention will be apparent from and will be mentioned in the following description of a contact-free rotary resistor arrangement according to the invention taken in conjunction with the accompanying drawing.

Figure 1:
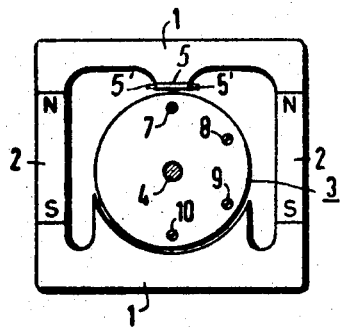
FIG. 1 is an end view of an illustrative embodiment of a first group type contact-free rotary resistor arrangement constructed in accordance with the principles of the invention.
Figure 2:
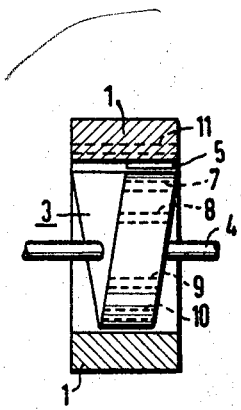
FIG. 2 shows a view, partly in section, of the arrangement of FIG. 1 from an aspect perpendicular to that of FIG. 1.

Referring now to FIGS. 1 and 2 wherein there are shown two aspects, perpendicular to each other of a first group type rotary resistor arrangement constructed in accordance with the invention, there is shown therein a worm-shaped yoke 3 comprising a soft magnetic material mounted on a rod member 4 which is disposed along the axis of rotation, yoke 3 being rotatable thereby about the axis of rotation. Yoke 3 is disposed in a magnetic circuit 1 which may suitably comprise, for example, a pair of permanent magnets 2. A galvanomagnetic semiconductor field plate 5 is provided in the narrow air gap defined by the peripheral edge of yoke 3 and the stationary portion of the magnetic circuit. The field plate 5 is provided with terminals 5' for connecting it to an electrical circuit (not shown). The numerals 7, 8, 9 and 10 designate four headless screws which are received in threaded bores within yoke 3, the axes of these bores lying parallel to the axis of rotation. Since the quantity of magnetic flux can be varied at a screw location, ten, twenty or more headless screws may, for example, be provided, their number being limited by their diameter magnitudes and the circumferences of yoke 3.

Figure 4:
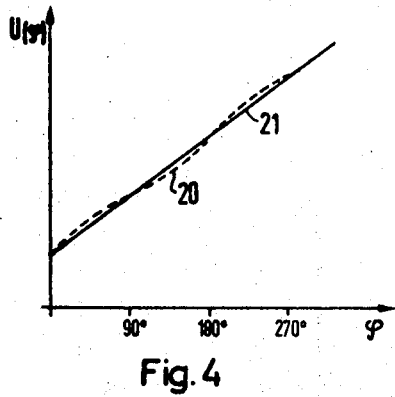
FIG. 4 is a curve showing the angle of rotation dependence of the resistance characteristic of rotary resistor arrangements and illustrates the precision effecting operation of the invention.

Let it be assumed, as an example, that the resistance characteristic of the rotary resistor arrangement is linear in dependence upon angle of rotation, i.e. the voltage $U(\alpha)$, i.e., the voltage produced across field plate 5 when it is connected in electrical circuit increases in proportion to the angle of rotation of yoke 3. Let it be further assumed that such resistance characteristic deviates from ideal linearity, without the use of adjusting screws according to the invention, such deviation being approximately depicted in the broken line curve 20 in FIG. 4 wherein the abscissa is angle or rotation of the yoke and the ordinate is the voltage. Now, with the aid of adjusting screws 7 to 10 to vary the magnetic field to which field plate 5 is subjected, curve 20 in FIG. 4 may be corrected in consequence of the fact that the screws are inserted more or less deeper into yoke 3 whereby curve 20 becomes substantially identical to curve 21.

Instead of providing headless screws 7 to 10 in yoke 3, screws 11 may be provided in the stationary portion of the magnetic surface near field plate 5. Screws 11 perform substantially the same function as screws 7 to 10 but in some situations are simpler to handle because they are inserted into a stationary structure.

Figure 3:
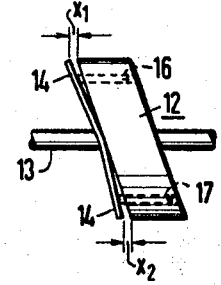
FIG. 3 is a view of another embodiment of a first group type rotary resistor arrangement according to the invention.

Another example of a first group type rotary resistor arrangement according to the invention is shown in FIG. 3. In this example, yoke 12 is a soft magnetic material slanted disc mounted at a slant on rod 13 which lies on the axis of rotation. Soft magnetic material discs 14 are provided at the side surface of yoke 12. Discs 14 may be shifted in position with respect to yoke 12 by means of adjusting screws, viz, headless screws 16 and 17 threadedly received in yoke 12. The notations $X_1$ and $X_2$ designate examples of such shifted distances. A magnetic flux displacement is accordingly also enabled with this type of FIG. 3 device to aid in the improving of its resistance characteristic.

The adjusting means according to FIG. 3 and that of FIGS. 1 and 2 may be utilized in both of the devices shown in these respective figures.

Figure 5:
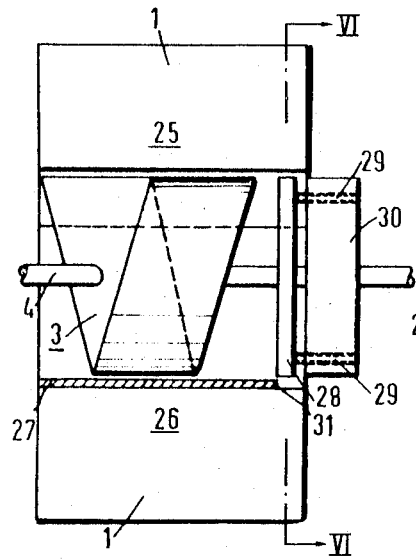
FIG. 5 is a view of another embodiment of a first group type rotary resistor arrangement according to the invention.
Figure 6:
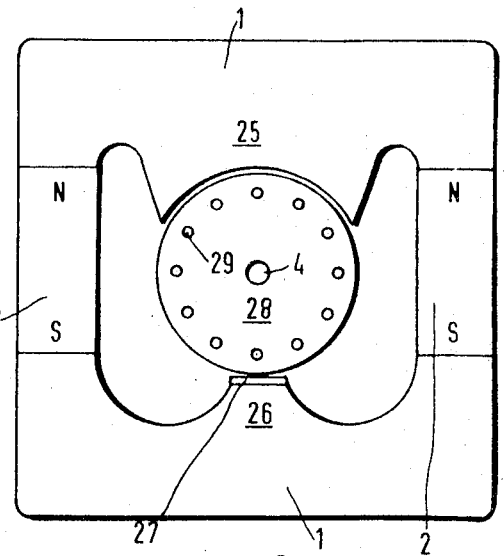
FIG. 6 is a view of the arrangement of FIG. 5 taken from the aspect of lines VI—VI in FIG. 5 looking in the direction of the arrows.

In FIGS. 5 and 6, there are shown in two aspects perpendicular to each other, a rotary resistor arrangement comprising a worm-shaped, soft magnetic material yoke similar to yoke 3 in FIGS. 1 and 2. In FIGS. 5 and 6, those structures corresponding to like structures in FIGS. 1 and 2 have been designated respectively with the same numerals. FIG. 6 is an aspect along lines VI—VI of FIG. 5 looking in the direction of the arrows.

In the arrangement of FIGS. 5 and 6, the rotatable yoke 3 mounted on axially disposed rod 4 is positioned between the pole shoes 25 and 26, at least one semiconductor field plate 27 being carried by pole shoe 26. As seen in FIG. 6, pole shoe 26 converges to a relatively narrow apical portion upon which field plate 27 is disposed, such design effecting a concentration of the magnetic flux upon field plate 27. In the air gap defined by the opposing faces of pole shoes 25 and 26 and axially spaced from yoke 3 is an adjusting disc 28 also mounted on axial member 4 and adapted to be rotated about the axis of rotation. The adjusting disc 28 suitably comprises a soft magnetic material and is of an elastic nature. Its edge may be shifted in the axial direction relative to an abutment member 30 by means of adjusting screws 29. Since adjusting disc 28 together with abutment member 30 is fixedly connected to yoke 3 through rod 4, disc 28 enables the cancelling out of any asymmetries in the magnetic system. The edge of disc 28, which is normally disposed next to edge 31 of field plate 27, may thereby be shifted more or less further across field plate 27, according to the invention to enhance the magnetic field to which field plate 27 is subjected.

Figure 7:
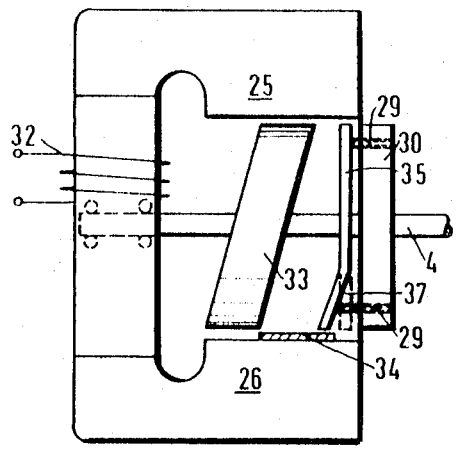
FIG. 7 is a depiction of another embodiment of a first group type rotary resistor arrangement according to the invention.

The embodiment shown in FIG. 7 is quite similar to that shown in FIGS. 5 and 6 and illustrates the diversity of configurations possible in the magnetic circuit and also illustrates that the magnetic circuit may be excited by means of a coil 32. Those structures in FIG. 7 which are the same as corresponding structures in FIGS. 5 and 6 have been designated with the same numerals.

Figure 8:
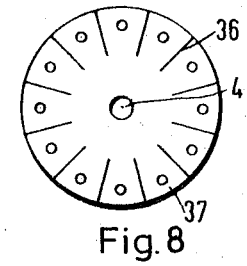
FIG. 8 shows an example of an adjusting means suitably utilized in the embodiment shown in FIG. 7.

The rotary resistor arrangement shown in FIG. 7 has a slanted disc yoke 33 rather than a worm-shaped yoke. The field plate 34 therein can be narrower than field plate 27 shown in FIGS. 5 and 6, i.e., it may have a length about equal to the thickness of yoke 33, particularly if field plate 34 is of the two terminal type. The adjusting disc 35 may have the configuration shown in FIG. 8. Such adjusting disc 35 is provided with a plurality of radially disposed grooves 36, the sectors defined by adjacent grooves being bendable in response to the action of a screw 29. Location 37 in FIG. 7 shows how such defined sector part of disc 35 may be protruded forward by a screw 29 to lie above an active portion of field plate 34 whereby the resistance of field plate 34 is increased.

Figure 9:
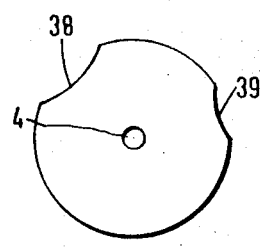
FIG. 9 is a depiction of another example of an adjusting means according to the invention.

FIG. 9 shows an adjusting disc whose periphery has been cut into at locations 38 and 39. Such type of configuration for an adjusting disc is advantageously employed in a rotary resistor arrangement if such arrangement exhibits pronounced asymmetry. When using the disc of FIG. 9, the disc is first cut away, as shown in FIG. 9, and then a precision adjustment is made utilizing the adjusting members described hereinabove. When using this disc, its edge is always disposed above the active portion of the field plate. The adjustment is effected by an appropriate cutting away of the disc edge, i.e., by changing the width of the air gap between the disc edge and the field plate.

Figure 10:
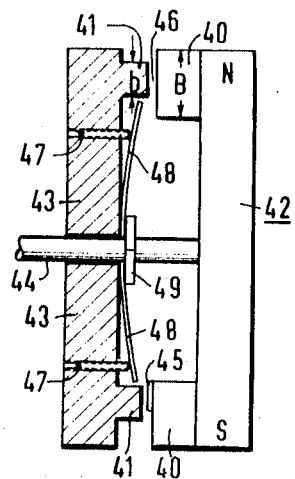
FIG. 10 is a depiction, partly in section, of an embodiment of a second group type rotary resistor arrangement according to the invention.
Figure 11:
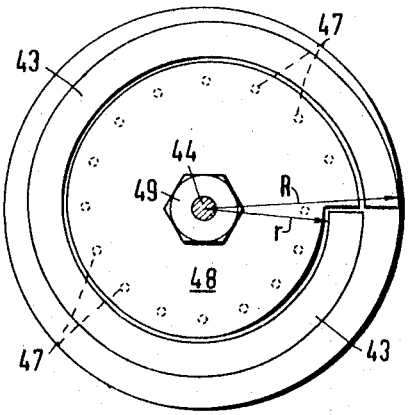
FIG. 11 shows the arrangement of FIG. 10 from an aspect perpendicular to that of FIG. 10.

FIGS. 10 and 11 show two aspects perpendicular to each other, of an embodiment of a second group type rotary resistor arrangement according to the invention, i.e., one in which the direction of the magnetic flux in the air gap is parallel to the axis of rotation of the yoke 43, yoke 43 being mounted on an axially disposed rod 44. The aspect of FIG. 10 is one perpendicular to the axis of rotation. The pole shoe of the stationary portion of the magnetic circuit is designated by the numeral 40 and it opposes the pole shoe 41 of yoke 43. The magnetic circuit is excited by a permanent magnet (N–S) 42. The width B of pole shoe 40 relates to the width b of pole shoe 41 in an approximately 2:1 or 3:1 ratio. In the interior space defined by spiral pole shoe 41, there is disposed a disc shaped adjusting member 48 which is elastic and which suitably comprises a soft magnetic material, disc 48 being suitably affixed by means of a screw 49. The distance of the disc edge from the air gap 46, which is defined by opposing pole shoes 40 and 41, may be varied with the aid of adjusting screws 47 threadedly received in yoke 43. A multiplicity of screws 47 may be provided as is shown in FIG. 11. With the use of an elastic, soft magnetic material member such as disc 48, the flux in air gap 46 wherein a field plate 45 is provided, as shown in FIG. 10, may be so varied whereby the rotary resistor arrangement has a chosen predetermined characteristic curve. The rendering precise of the resistance characteristic of the rotary resistor arrangement of FIGS. 10 and 11 is effected in a manner similar to that in which the other rotary resistor arrangements described hereinabove are made precise as to their resistance characteristics.

Figure 12:
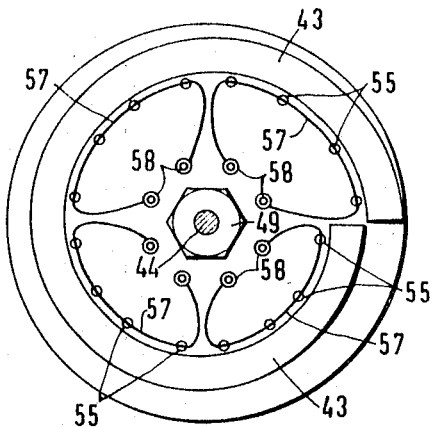
FIG. 12 is an end view of another embodiment of a second group type rotary resistor arrangement.

In the rotary resistor arrangement embodiment shown in FIG. 12 which is a view looking in the axial direction, the face of the spiral shaped pole shoe is also designated with the numeral 43. Except for the disc 48 in the arrangement of FIGS. 10 and 11, the arrangement of FIG. 12 is essentially similar in structure thereto. However, the adjusting member or members in the FIG. 12 arrangement comprises flat wire brackets 57 which are elastic and comprise a soft magnetic material. Their distance from the air gap may be varied with the aid of adjusting screws 55 which also function to affix the wire brackets.

Figure 13:
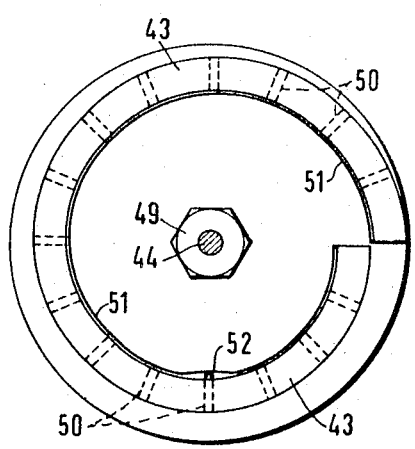
FIG. 13 is an end view of yet another embodiment of a second group type rotary resistor arrangement.

FIG. 13 is also a view looking in the axial direction of the yoke of another embodiment of a second group type rotary resistor arrangement. The yoke 43 in FIG. 13 essentially has the same form as the yokes of FIGS. 10 and 11, and FIG. 12. However, the adjusting members in the FIG. 13 arrangement comprise the elastic soft magnetic material metal band 51 which may be affixed to the inner peripheral surface of the pole shoe of the yoke. FIG. 13 only shows one such band 51 on the inner peripheral surface of the spiral-shaped pole shoe. However, a band 51 may also be provided on the outer peripheral surface of the pole shoe of the yoke. The distance of band 51 from the peripheral surface of the pole shoe 43 may be varied by means of adjusting screws 50, as indicated, for example, at location 52. In this embodiment, as in all of the other embodiments, the adjusting screws suitably may comprise a soft magnetic material.

It is, of course, to be realized that, in accordance with the invention, rotary resistor arrangements of the second group type may also be adjusted using only soft magnetic material headless screws as described, for example, in the first group type rotary resistor arrangement shown in FIGS. 1 and 2.

The galvanomagnetic semiconductor field plates employed in the above-described rotary resistor arrangements suitably should have the strongest possible galvanomagnetic resistance. Suitable semiconductor materials are the known $A^{III}$, $B^V$ materials wherein $A^{III}$ is an element of the third group and $B^V$ is an element of the fifth group of the periodic table of materials, examples of such materials being indium antimonide and indium arsenide. A particularly strong galvanomagnetic resistance is obtained if good electrical conductivity anisotropic needle-shaped inclusions are embedded in the semiconductor material in spaced substantially parallel relationship. A suitable example of an inclusion-semiconductor material combination may, for example, be nickel antimonide needles in indium antimonide.

It will be obvious to those skilled in the art upon studying this disclosure that contact-free rotary resistor arrangements according to our invention permit of a great variety of modifications and hence can be given embodiments

We claim:

1. A galvanomagnetic semiconductor rotary resistor arrangement having a magnetic circuit comprising a magnetic stationary portion defining an air gap and a magnetic portion adapted to be rotated about an axis of rotation and disposed within said air gap to be freely rotatable therein, at least one galvanomagnetic semiconductor field plate means being mounted in said air gap so as to be traversible by a magnetic field upon rotation of said rotatable magnetic portion, means for connecting said plate means in an electrical circuit, and magnetic material adjusting means provided in one of said portions which is movable to adjustably vary the magnetic flux in said air gap.

2. A galvanomagnetic semiconductor rotary resistor arrangement as defined in claim 1 wherein the portions of said magnetic circuit are arranged to produce a magnetic flux in said air gap which has a direction substantially perpendicular to said axis of rotation.

3. A galvanomagnetic semiconductor rotary resistor arrangement as defined in claim one wherein the portions of said magnetic circuit are arranged to produce a magnetic flux in said air gap which has a direction substantially parallel to said axis of rotation.

4. A galvanomagnetic semiconductor rotary resistor arrangement having a magnetic circuit comprising a stationary portion and a portion adapted to be rotated about an axis of rotation relative to said stationary portion, said stationary portion comprising magnet means for magnetically exciting said circuit, a pair of magnetic material pole shoes associated with said magnet means and disposed whereby their respective faces define an air gap therebetween, said rotatable portion comprising a magnetic material yoke disposed in said air gap between said faces and adapted to be rotated about said axis of rotation, at least one galvanomagnetic semiconductor field plate means on one of said pole shoe faces, whereby upon the rotation of said yoke said field plate is traversed by the magnetic field in said air gap, and adjusting means comprising a magnetic material and contained in at least one of said magnetic circuit portions and movable to the magnetic field to which said field plate is subjected to, said field plate having means for connecting it in an electrical circuit such that the current path therethrough is substantially parallel to said axis of rotation.

5. A galvanomagnetic semiconductor field plate as defined in claim 4 wherein said yoke is worm-shaped, wherein said field plate has a length substantially equal to the peripheral thickness of said yoke and has an electric terminal at each end thereof for adapting it to be connected in an electrical circuit, and wherein said adjusting means comprises at least one headless screw threadedly received in a bore provided therefor in one of said portions of said magnetic circuit and movable therealong in a direction substantially parallel to said axis of rotation.

6. A galvanomagnetic semiconductor rotary resistor arrangement as defined in claim 5 wherein said adjusting means comprises a plurality of said headless screws threadedly received in bores provided therefor in at least one of said pole shoes and in said yoke.

7. A galvanomagnetic semiconductor rotary resistor arrangement comprising a magnetic circuit having a stationary portion and a portion adapted to be rotated about an axis of rotation relative to said stationary portion, said stationary portion comprising magnet means for magnetically exciting said circuit, a pair of magnetic material pole shoes associated with said magnet means and disposed whereby their respective faces define an air gap therebetween, said rotatable portion comprising a magnetic material yoke disposed in said air gap between said faces and adapted to be rotated about said axis of rotation, at least one galvanomagnetic semiconductor field plate means on one of said pole shoe faces, whereby upon the rotation of said yoke said field plate is traversed by the magnetic field in said air gap, and adjusting means comprising a magnetic material and contained in at least one of said magnetic circuit portions and movable to the magnetic field to which said field plate is subjected to, said field plate having means for connecting it in an electrical circuit such that the current path therethrough is substantially parallel to said axis of rotation, said yoke being slanted disc and said adjusting means comprising an elastic disc of a magnetic material disposed adjacent a surface of said yoke, and headless screws threadedly received in bores provided therefor about the periphery and within said yoke, said screws being movable along said bores in a direction substantially parallel to said axis of rotation to force the peripheral portion of said elastic disc away from said surface to thereby vary the magnetic field to which said field plate is subjected.

8. A galvanomagnetic semiconductor rotary resistor arrangement as defined in claim 4 wherein said yoke is worm-shaped and wherein said adjusting means comprises an elastic magnetic material disc disposed on said axis of rotation and so spaced from said yoke whereby its peripheral edge normally does not oppose any portion of said field plate, an abutment member disposed on said axis of rotation and spaced from said disc, and adjusting headless screws threadedly received within bores provided therefor through the peripheral portion of said abutment member and movable therein in a direction substantially parallel to said axis of rotation, said movement of said screws in said bores bending the peripheral portion of said adjusting disc to a point where it opposes a portion of said field plate to thereby vary the magnetic field to which said field plate is subjected.

9. A galvanomagnetic semiconductor rotary resistor arrangement as defined in claim 4 wherein said yoke is a slanted disc and wherein said adjusting means comprises an elastic magnetic material adjusting disc disposed on said axis of rotation and so spaced from said yoke whereby its peripheral edge normally does not oppose any portion of said field plate, an abutment member disposed on said axis of rotation and spaced from said adjusting disc, and adjusting headless screws threadedly received within bores provided therefor through the peripheral portion of said abutment member and movable therein in a direction substantially parallel to said axis of rotation, said movement of said screws in said bores bending the peripheral portion of said adjusting disc to a point where it opposes a portion of said field plate to thereby vary the magnetic field to which said field plate is subjected.

10. A galvanomagnetic semiconductor resistor arrangement as defined in claim 9 wherein said adjusting disc has a plurality of radially disposed grooves therethrough, adjacent grooves defining a circular disc sector therebetween.

11. A galvanomagnetic semiconductor resistor arrangement as defined in claim 9 wherein said adjusting disc has at least one cut away portion at its periphery.

12. A galvanomagnetic semiconductor rotary resistor arrangement comprising a magnetic circuit having a magnetic stationary portion, and a magnetic portion adapted to be rotated about an axis of rotation, said stationary portion comprising magnet means for magnetically exciting said magnetic circuit and magnetic material pole shoe means extending laterally from the periphery of said magnet means, said rotatable portion comprising a yoke having a pole shoe extending laterally from the peripheral portion thereof, the faces of said pole shoes being in opposed spaced relationship to define an air gap therebetween, the direction of the magnetic field in said air gap being in a direction substantially parallel to said axis of rotation, at least one galvanomagnetic semiconductor field plate on the air gap opposing face of said stationary pole shoe, said field plate being adapted to be connected in an electrical circuit, an elastic magnetic material adjusting means affixed at said axis of rotation adjacent to said yoke in the space defined by said yoke pole shoe, and magnetic material headless screws threadedly received in bores aligned substantially parallel to said axis within said yoke adjacent said adjusting means, said screws being movable along said bores to bend said adjusting means away from said yoke.

13. A galvanomagnetic semiconductor rotary resistor arrangement as defined in claim 12 wherein said yoke pole shoe is spiral-shaped and said adjusting means is a disc.

14. A galvanomagnetic semiconductor rotary resistor arrangement as defined in claim 12 wherein said yoke pole shoe is spiral-shaped and said adjusting means comprises flat wire brackets.

15. A galvanomagnetic semiconductor rotary resistor arrangement as defined in claim 14 wherein said yoke is spiral-shaped and said adjusting means is at least one elastic magnetic material band disposed along one of the peripheral surfaces of said yoke pole shoe and headless screws threadedly received in bores provided therefor in said yoke pole shoe, said bores being disposed whereby movement of said screws along said bores forces said band away from said surface.

16. A galvanomagnetic semiconductor resistor arrangement as defined in claim 12 wherein the ratio of the width of said stationary pole shoe face to the width of said yoke pole shoe face is between two and three to one.

References Cited
UNITED STATES PATENTS

| | | | |
|---|---|---|---|
| 2,536,805 | 1/1951 | Hansen | 310—10 |
| 2,924,633 | 2/1960 | Sichling et al. | 338—32 |
| 3,018,395 | 1/1962 | Carlstein | 338—32 |
| 3,112,464 | 11/1963 | Ratajski et. al. | 338—32 |
| 3,152,261 | 10/1964 | Carlstein | 324—45 |
| 3,162,804 | 12/1964 | Parsons | 338—32 |
| 3,194,990 | 7/1965 | Kendall | 338—32 |

RICHARD M. WOOD, *Primary Examiner.*

W. D. BROOKS, *Assistant Examiner.*